Patented Feb. 16, 1954

2,669,581

UNITED STATES PATENT OFFICE 2,669,581

MANUFACTURE OF RESORCYLIC ACID

Mario Scalera, Somerville, and Sien Moo Tsang, Bound Brook, N. J., assignors to American Cyanamid Company, New York, N. Y., a corporation of Maine No Drawing. Application July 27, 1951, Serial No. 239,020

4 Claims. (Cl. 260—521)

The present invention relates to an improved method of preparing beta-resorcyclic acid or 2,4-dihydroxybenzoic acid.

Beta-resorcyclic acid is an important intermediate in the manufacture of fluorescent textile brighteners and other products. In the past, this intermediate has been prepared from resorcinol. The method, while practical, is not fully satisfactory and depends on resorcinol which, at times, is in very short supply.

The present invention utilizes an entirely different starting material, p-aminosalicylic acid which is produced in very large quantities for pharmaceutical and other uses. Theoretically, it should be possible to prepare beta-resorcylic acid by diazotizing p-aminosalicylic acid and hydrolyzing the diazo group to replace it with hydroxyl. Unfortunately, the common methods of diazotization and hydrolysis will not work and no usable process can be based on them. Among other difficulties encountered is a serious one of self-coupling because p-aminosalicylic acid itself has a configuration which makes it an azoic coupling component. The azoic colors produced constitute highly colored contaminants which can not be removed economically, and seriously reduce the yield of beta-resorcylic acid. In fact, it has been found actually to be impossible to isolate any pure resorcylic acid by this method, which therefore has no practical utility whatever.

According to the present invention it has been found that by special reaction conditions, p-aminosalicylic acid can be diazotized and hydrolyzed to produce high yields of relatively pure beta-resorcylic acid free from colored contaminants. The reaction conditions are critical, the most critical being the diazotization step itself. It is essential that the alkali metal nitrite and the p-aminosalicylic acid or one of its salts such as the sodium, potassium or calcium salt be added simultaneously and gradually to an aqueous mineral acid solution. Diazotization proceeds with almost complete avoidance of side reactions. While it is possible to mix the p-aminosalicylic acid and alkali metal nitrite in the form of a dry powder and this powder can be directly added to the dilute mineral acid solution, this procedure is less convenient and therefore, the preferred method involves dissolving the alkali metal nitrite and the p-aminosalicylic acid in the form of its salt in water and gradually adding this solution to the mineral acid. Since p-aminosalicylic acid is sufficiently strong to produce diazotizing conditions, it must not be mixed with an alkali metal nitrite in water, otherwise, side reactions will occur producing colored products. If the free acid is to be used, it must either be kept separate from the nitrite until the moment of diazotization, or the two must be mixed dry. Salts of p-aminosalicylic acid may be dissolved with the alkali metal nitrite in water without any danger of side reactions. Of course, the strength of the mineral acid solution should be correspondingly adjusted to take into account the amount of water present in the alkali metal nitrite-p-aminosalicylic acid solution. While it is essential that the alkali metal nitrite and p-aminosalicylic acid be added gradually to the mineral acid, the exact amount of water present is not a critical factor and may, in general, conform to the concentrations used in ordinary diazotization procedures.

After diazotization has been completed in the particular manner described above, hydrolysis must be effected under carefully regulated conditions. If the diazo solution is heated as is conventional in the hydrolysis step of other diazotized compounds, a great deal of foaming occurs, side reactions result and no practical commercial process can be based on this step. According to the present invention, however, foaming and side reactions are reduced to a negligible minimum by a particular technique, namely, the gradual drowning of the diazo solution in a hot aqueous medium.

In ordinary diazotization proceedings, hydrochloric acid is the mineral acid of choice. It is possible to use hydrochloric acid in the special process of the present invention but improved results are obtained if the acidic medium is free from halide ions during the diazotization and hydrolysis. The preferred method, therefore, uses a halogen-free mineral acid. Sulfuric acid is preferred as it gives optimum results at the lowest cost. Other halogen-free mineral acids may also be used such as phosphoric acid, but their high cost makes them economically less desirable than sulfuric acid. It has not been definitely determined why practical diazotization and hydrolysis of p-aminosalicylic acid is only possible when the particular diazotization technique set out above is used. The best acid, hydrochloric, for ordinary diazotizations gives inferior results in the process of the present invention as compared with halogen-free acids. Side reactions appear in which the halide ion takes part. It is not known why the side reactions proceed so rapidly in the process of the present invention. It is not, therefore, desired to limit the invention to a particular theory as to why these anomalous behaviors occur.

Another difference of the process of the present invention from ordinary diazotization and hydrolysis lies in the behavior of copper as a catalyst. In conventional diazotization and hydrolysis reactions, copper is widely used as a catalyst and in many cases practical yields and outputs are impossible without its presence. In the special process of the present invention, however, copper does not appear to behave in the same manner. In fact, it does not appear to have any catalytic effect. Successful results are obtainable whether a copper catalyst is present or absent and either procedure is included in the present invention. It is not known why copper should be a necessary catalyst for practical operation in most conventional diazotization and hydrolysis processes, and to have practically no effect in the special process of the present invention.

The diazotization and hydrolysis steps of the present invention may be separate steps. However, we have found that it is possible to combine diazotization and hydrolysis in a single operation by adding the mixture of alkali metal nitrite and p-aminosalicylic acid, preferably in solution, to the mineral acid at a temperature high enough to hydrolyze the diazo compound as fast as it forms. This modification presents great advantages in speed and simplicity.

After hydrolysis is complete, whether the process has been carried out in two separate steps or as preferred, in a single step, the resorcylic acid is readily isolated in good yield and purity by filtration. It is an advantage of the invention that such conventional cheap recovery means may be used. The filtrate contains some resorcylic acid because of its appreciable solubility in water, but this does not result in a loss as the product can readily be recovered from the mother liquor by solvent extraction or concentration and further precipitation. It is an advantage that these conventional methods of isolation may be used without any critical conditions.

The present invention will be further illustrated by the following specific examples, the parts being by weight unless otherwise specified.

Example 1

A solution of 15.3 parts of p-aminosalicylic acid, 24.2 parts of 5N sodium hydroxide solution, and 104 parts of N sodium nitrite solution, is diazotized by gradually being added to 31.3 parts of 97% sulfuric acid, together with enough ice to keep the temperature below 0° C. A residual trace of nitrite is then destroyed by the addition of sulfamic acid, and the resulting yellow solution is gradually added to 50.0 parts of water at 60–75° C. The resulting very light, reddish-brown solution is clarified by filtration, cooled thoroughly, and the product filtered. Additional product is obtained by strong acidification of the filtrate with sulfuric acid, followed by filtration. The yield is excellent.

Example 2

15.3 parts of p-aminosalicylic acid is converted to its sodium salt by slurrying in 24 parts of 5N sodium hydroxide solution. To this is added 104 parts of N sodium nitrite solution. The solution is stabilized with a trace of sodium hydrosulfite and gradually added to 31.3 parts of sulfuric acid of sp. gr. 1.84 which has been iced internally to −10° to 0° C. The resulting diazo solution is then added, at a temperature of 75–90° C., to 140 parts of 50% sulfuric acid.

When the reaction is complete, the reddish orange solution is clarified by filtration, cooled thoroughly, and filtered. An excellent yield of product is obtained.

Example 3

A solution of 15.3 parts of p-aminosalicylic acid, 24.4 parts of 5N sodium hydroxide solution, 104 parts of N sodium nitrite solution, and 40 parts of water, is gradually added, at a temperature of 75–82° C., to a solution of 350 parts of 50% sulfuric acid in 250 parts of water. When the reaction is complete, the resulting light reddish-brown solution is cooled thoroughly and filtered. A good yield of product is obtained.

Example 4

A solution is prepared from 15.31 parts of p-aminosalicylic acid, 22 parts of 5N sodium hydroxide, 104 parts of N sodium nitrite and a trace of sodium hydrosulfite. This is added to 49 parts of 12N hydrochloric acid which has been iced internally to −10° C. The resulting red orange diazo solution is gradually added to 140 parts of 50% sulfuric acid at a temperature of 90° C. When the reaction is complete, as shown by the absence of any remaining diazo compound, the reaction mixture is cooled and filtered to isolate the resorcylic acid. Although this procedure gives satisfactory results, the yield of the product is somewhat lower than in the case of sulfuric acid diazotization and the product is contaminated with some chlorosalicylic acid.

Similar results are obtained if the p-aminosalicylic acid is used in the form of its calcium salt. In this case the precipitated calcium sulfate, after completion of hydrolysis, can be filtered off before the solution is cooled to crystallize the resorcylic acid.

We claim:

1. A single-step process of converting p-aminosalicylic acid to resorcylic acid which comprises adding an alkali metal nitrite and p-aminosalicylic acid simultaneously to a hot aqueous mineral acid solution maintained at a temperature above 60° C.

2. A process according to claim 1 in which the alkali metal nitrite and the p-aminosalicylic acid in the form of a soluble metal salt are dissolved in water before addition to the hot mineral acid.

3. A process according to claim 2 in which the mineral acid solution is free from halide ions.

4. A process according to claim 1 in which the mineral acid solution is free from halide ions.

MARIO SCALERA.
SIEN MOO TSANG.

References Cited in the file of this patent

FOREIGN PATENTS

| Number | Country | Date |
|--------|---------|------|
| 567,217 | Great Britain | Feb. 2, 1945 |

OTHER REFERENCES

Fischer, Liebigs Ann., vol. 127, pp. 145–149 (1863).

Brydowna, Chem. Zentr., vol. 1928 I, Fr. 2320.

Saunders: "The Aromatic Diazo Compounds" (Edward Arnold and Co.), pp. 3, 9–10 (1949).

Saunders: "The Aromatic Diazo Compounds" (Edward Arnold and Co.), pp. 302–3 (1949).